United States Patent [19]

Botts

[11] 4,160,924
[45] Jul. 10, 1979

[54] CRYOGENIC TEMPERATURE OPERATED MAGNETIC RECIPROCATING MOTOR SYSTEM

[75] Inventor: Elton M. Botts, Mattoon, Ill.

[73] Assignee: Energy 76, Inc., Mattoon, Ill.

[21] Appl. No.: 813,761

[22] Filed: Jul. 7, 1977

[51] Int. Cl.² .............................................. H02K 33/00
[52] U.S. Cl. ..................................... 310/17; 310/306; 310/10
[58] Field of Search ....................... 310/15, 16, 17, 30, 310/10, 308, 306

[56] References Cited

U.S. PATENT DOCUMENTS

| | | | |
|---|---|---|---|
| 3,252,018 | 5/1966 | Drautman | 310/16 |
| 3,443,128 | 5/1969 | Fakan | 310/10 |
| 3,725,705 | 4/1973 | Borinski | 310/308 |
| 3,875,435 | 4/1975 | Fletcher | 310/306 |
| 3,949,249 | 4/1976 | Wiseley et al. | 310/17 |
| 3,968,387 | 7/1976 | Scarff | 310/16 |

*Primary Examiner*—Donovan F. Duggan
*Attorney, Agent, or Firm*—Paul M. Denk

[57] ABSTRACT

A permanent magnet armature is reciprocated between electromagnetic coil assemblies in a motor chamber that is evacuated and maintained at a cryogenic temperature by circulation of a cryogenic cooling medium through pressure sealed, coil enclosing spaces of the coil assemblies. Shock absorbers absorb the thrust applied by the armature to the coil assemblies at the ends of its stroke. The armature drives pumps for transmitting motive energy externally of an insulated enclosure within which the power plant is housed.

9 Claims, 8 Drawing Figures

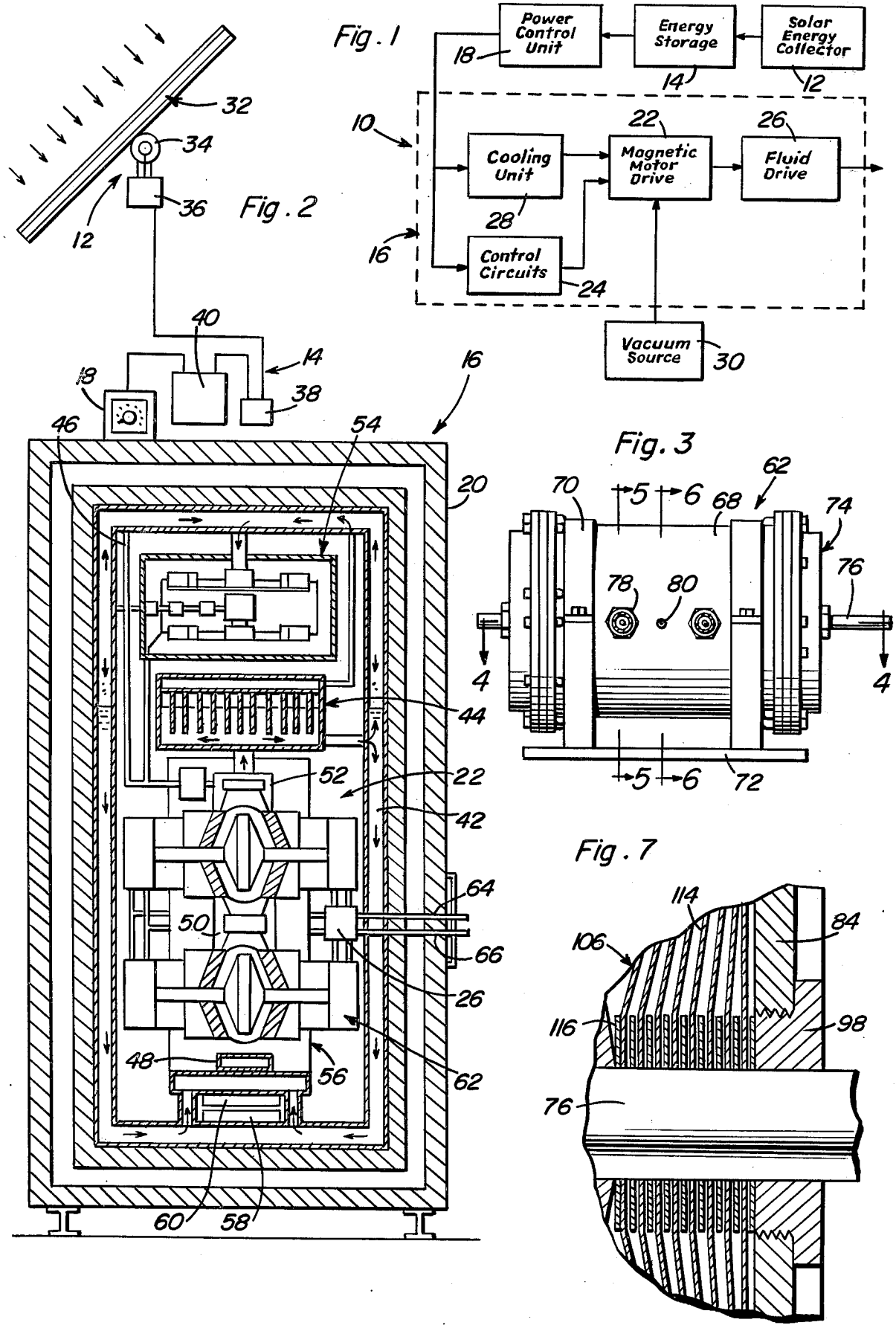

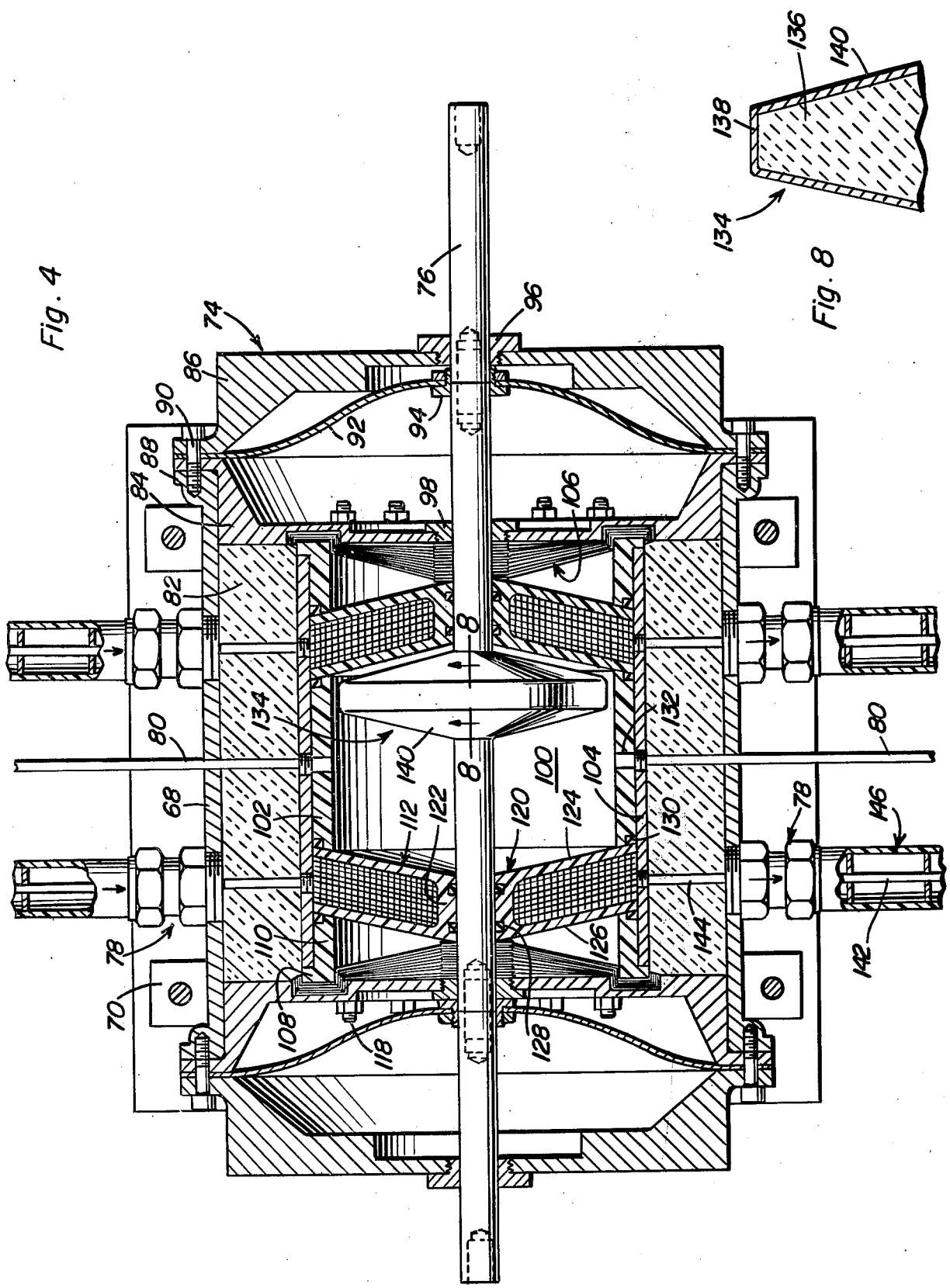

CRYOGENIC TEMPERATURE OPERATED MAGNETIC RECIPROCATING MOTOR SYSTEM

BACKGROUND OF THE INVENTION

This invention relates to power generating systems employing as a prime mover a reciprocating magnetic motor of the type disclosed in my prior U.S. Pat. No. 3,949,249.

The development of a power generating plant which will more efficiently convert stored sources of energy into mechanical or motive energy without pollution of the environment has become extremely vital because of the approaching crises with respect to dwindling energy reserves and eccological deterioration. It is well known that electrical motors provide a most efficient and pollution free method of converting electrical energy into motive energy and that the efficiency is dramatically improved by motor operation in a reduced temperature environment by use of a cooling system. A practical and effective power generating plant of such a type is, however, lacking at the present time.

It is therefore an important object of the present invention to provide a practical arrangement of a dynamo-electric converter operating under reduced temperature conditions for efficient generation of motive energy.

Description of the Prior Art

In addition to my own prior U.S. Pat. No. 3,949,249 aforementioned, I am aware of the following U.S. patents:

Nos.
2,717,310
2,820,159
3,252,018
3,968,387
3,971,454

The foregoing patents while exemplifying the background and prior art hereinbefore alluded to, do not show the particular structure and arrangement upon which patentability is predicated.

SUMMARY OF THE INVENTION

In accordance with the present invention, a reciprocating magnetic motor is operated by energization of its electromagnetic motor coils from a source of stored electrical energy supplied to the coils by conductors in conduits that also circulate a cryogenic cooling medium through the spaces occupied by the coil conductors of the coil assemblies. The motor armature in the form of a permanent magnet, is enclosed in an insulated chamber to maintain cryogenic temperature conditions under which the magnetic flux field is axially concentrated and confined along a magnetic polar axis parallel to the travel of the armature. The motor as well as the solid-state circuits through which the current and polarity of the electrical energy is controlled, are also maintained at a reduced temperature by an insulated enclosure internally lined by a passage through which the cryogenic medium is circulated. Pump devices driven by the motor effect circulation of a pressure operating medium through which motive energy is transmitted from the motor externally of the insulated enclosure to avoid leakage and reduced mechanical losses. The motor coils effect reciprocating travel of a pump driving power shaft connected to the armature. The confinement and orientation of the permanent magnetic field concentrated adjacent to the reciprocating armature, cooperates with the magnetic fields electromagnetically induced by the fixed motor coils to maintain the armature field at full strength and amplify the motor output.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a block diagram depicting the power generating system of the present invention.

FIG. 2 is a schematic illustration of same of the apparatus constituting the system depicted in FIG. 1.

FIG. 3 is a side elevation view of one of the converters associated with the system shown in FIG. 2.

FIG. 4 is an enlarged longitudinal section view taken substantially through a plane indicated by section line 4—4 in FIG. 3.

FIG. 7 is an enlargement of a portion of FIG. 4.

FIG. 8 is an enlarged partial section view taken substantially through a plane indicated by section line 8—8 in FIG. 4.

DESCRIPTION OF THE PREFERRED EMBODIMENT

Figure 5:
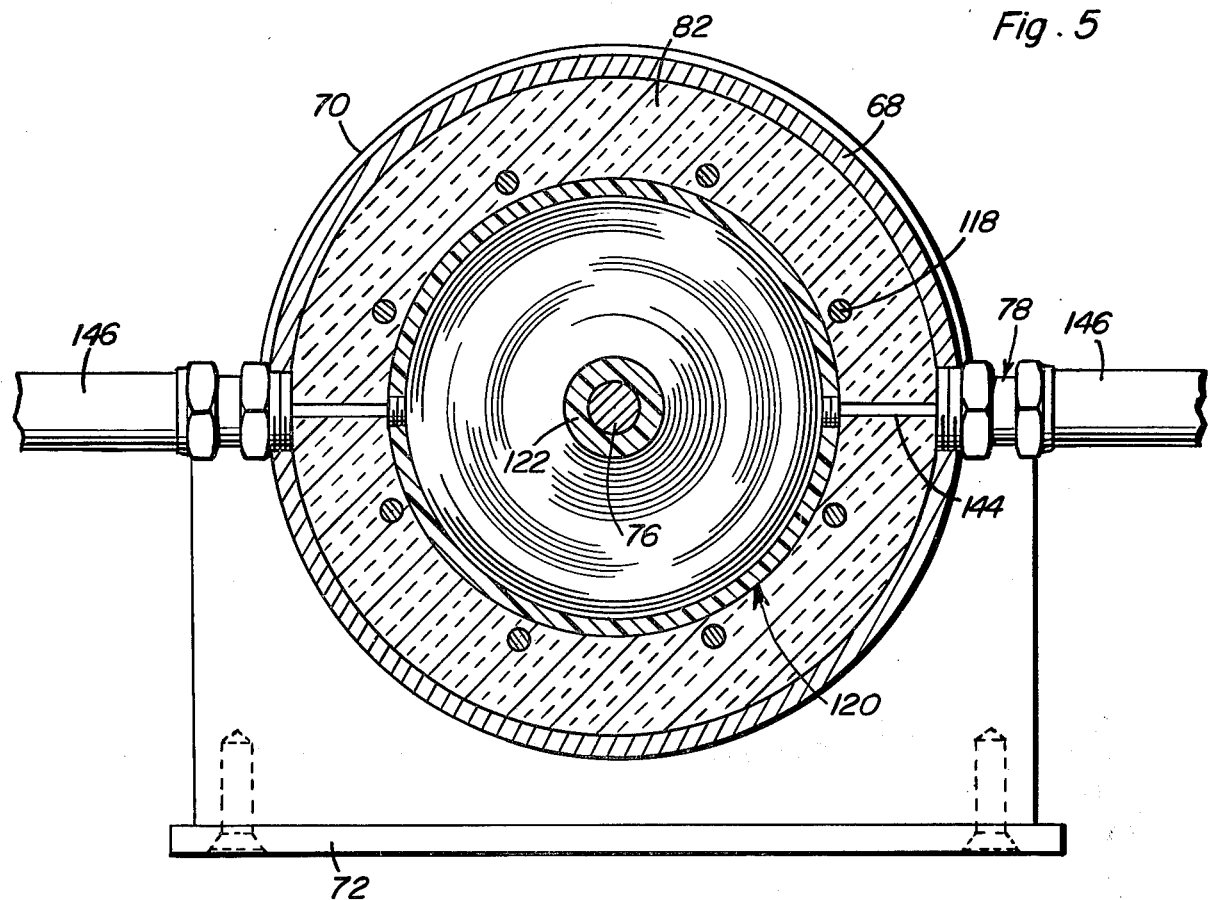
FIG. 5 is an enlarged transverse section view taken substantially through a plane indicated by section line 5—5 in FIG. 3.

Referring now to the drawings in detail, FIG. 1 is a block diagram depicting the power generating system of the present invention, generally referred to by reference numeral 10. The system consists of a source of energy in the form of a solar energy collector 12 connected to energy storage component 14 from which electrical energy is fed to a power plant 16 by means of a power control unit 18. The power plant is enclosed within an insulated enclosure 20 and has suspended therein a magnetic motor assembly 22 to which the electrical energy is fed at a regulated rate through control circuits 24 by means of which polarity control is also exercised for proper operation of the motor assembly. The mechanical output of the motor assembly is transmitted exteriorly of the enclosure 20 by means of a fluid drive 26. An external vacuum source 30 maintains the working chamber in the motor assembly evacuated. A cooling system 28 establishes cryogenic temperature conditions under which the motor assembly 22 and circuits 24 are efficiently operated. The temperature at which Nitrogen liquefies constitutes the cryogenic temperature, for example, where Nitrogen is utilized as the cryogenic medium. The vacuum maintained within the motor assembly by the vacuum source 30 reduces the loading thereon during operation as will be explained hereinafter.

FIG. 2 schematically illustrates the power generating system depicted in FIG. 1. The solar energy collector 12, as shown, includes a solar cell mounting panel 32 that is positioned by means of an angle adjuster 34 so as to receive maximum radiation from the sun. A rotator device 36 is operatively connected to the angle adjuster so as to follow relative movement of the sun for this purpose. The solar energy collected by the panel 32 is converted into electrical energy by means well known to those skilled in the art, this electrical energy being utilized to operate the angle adjusting rotator 36. The converted electrical energy is also fed to a trickle charger 38 through which a d.c. battery 40 is maintained in a charged condition as it supplies electrical energy through the power control unit 18 to the power plant 16. The charger 38 and battery 40 constitute the energy storage component 14 as aforementioned. It should, of course, be appreciated that other sources of electrical energy may be utilized either as an alternative source of energy or an additional source of energy to be converted into motive energy by the power plant.

With continued reference to FIG. 2, the power plant 16 is enclosed by the insulated enclosure 20 which is internally lined with a passage 42. The passage 42 encloses a body of cryogenic cooling medium, such as Nitrogen, which exists in both the liquid and gaseous states. The cooling medium is circulated through the passage 42 by the cryogenic cooling system 28 as aforementioned. The cooling system 28 may be of any well known type through which vaporized cooling medium is compressed and recirculated through the system in order to maintain cryogenic temperature conditions within the outer enclosure 20 and within the magnetic motor assembly 22. A power cable 46 extends from the power control unit 18 to the motor assembly for energizing the motor assembly and for operating the cooling system 28. The cooling system is thereby operative to cause circulation of cooling medium through the passage 42, through the electronic packages 48, 50 and 52 housing solid-state control circuits 24 aforementioned and through the motor assembly 22 itself. In its liquid state the cooling medium will absorb heat to establish the reduced cryogenic temperature under which the control circuits and magnetic motor assembly efficiently operate before it is returned to a separator 44 at an elevated temperature. The liquid portion of the cooling medium is then recirculated from the separator through the passage 42 while the vaporized portion is conducted into a compressor portion 54 of the cooling system so as to be converted back into the liquid state at a cryogenic temperature before it is returned to the circulating passage 42.

The motor assembly 22, the solid state control circuits 24 and the fluid drive 26 are mounted by a common sub-frame assembly 56 adapted to be suspended within the outer enclosure 20 by means of a pair of powerful permanent magnets 58 and 60 as shown in FIG. 2. Magnetic suspensions of this type are well known per se, the details of which form no part of the present invention. Likewise, no details are shown for the control circuits 24 since they are also well known as referred to, for example, in my prior U.S. Patent aforementioned. In the embodiment illustrated, the motor assembly 22 includes two similar converter units 62 operatively connected with the fluid drive 26 in order to transmit motive energy exteriorly of the outer enclosure 20 by means of a pair of pressure fluid conduits 64 and 66. Accordingly, an operating pressure medium is associated with the motor assembly in addition to the cooling medium through which operation of the motor assembly is maintained at the reduced cryogenic temperature.

FIG. 3 illustrates one of the converter units 62 associated with the motor assembly. The converter unit includes a cylindrical housing 68 secured by a pair of axially spaced clamps 70 to a base 72. The opposite axial ends of the housing 68 have associated therewith a pair of diaphragm sealing devices 74. Also extending centrally and axially through the converter unit is a power shaft 76. A pair of axially spaced fittings 78 are connected to the housing 68 through which electrical energy and cooling medium is conducted. An opening is formed in the housing between the fittings 78 to receive a pipe 80 through which the interior of the housing is evacuated by the vacuum pump 30 aforementioned.

Figure 6:
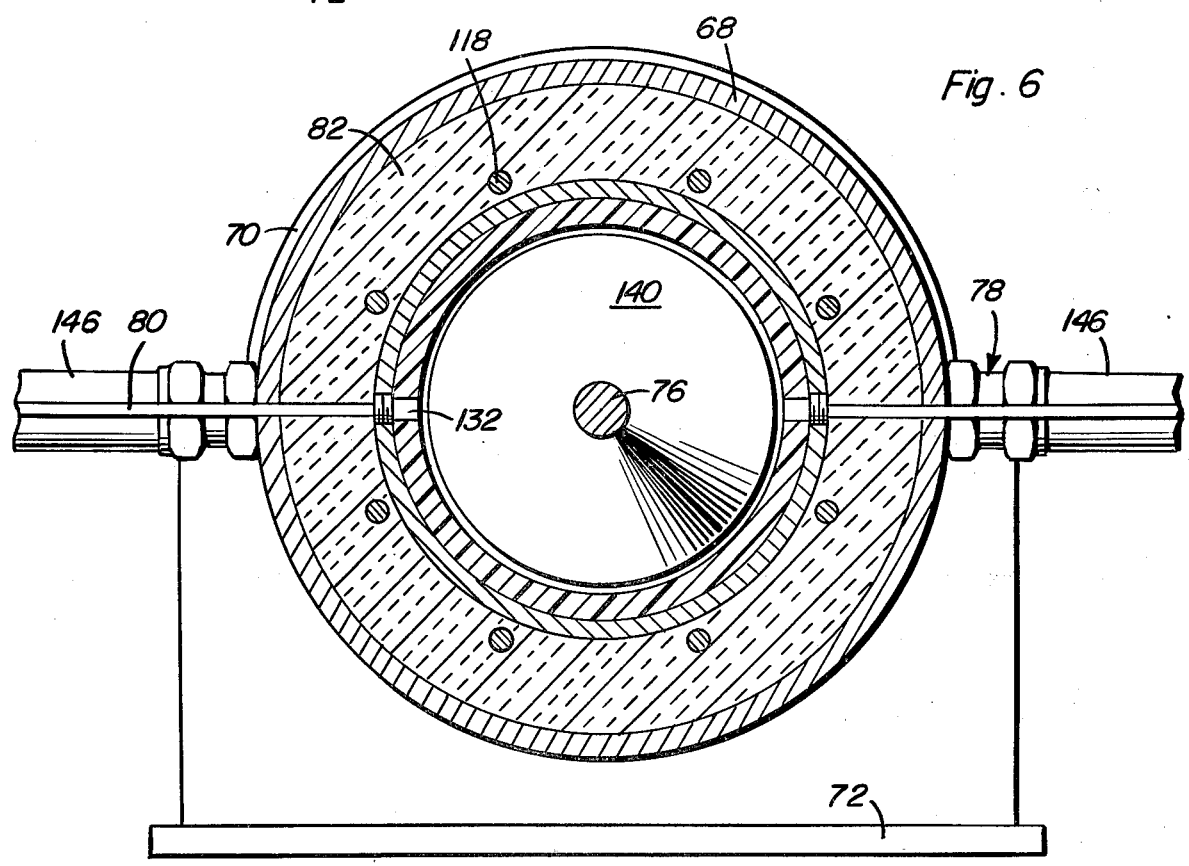
FIG. 6 is an enlarged transverse section view taken substantially through a plane indicated by section line 6—6 in FIG. 3.

Referring now to FIG. 4, the housing 68 is internally lined with thermal insulation 82 which extends axially between the diaphragm devices 74. Each diaphragm device 74 includes an axially inner casing section 84 fitted within the ends of the housing 68 abutting the insulation 82. An axially outer casing section 86 is held assembled with the inner casing 84 and secured to the axial end flange 88 of the housing 68, by means of threaded fasteners 90. The diaphragm devices 74 through their casing sections thereby close the opposite ends of the housing. A flexible diaphragm 92 is peripherally clamped between the casing sections of each pump device so as to separate the interior of the pump devices into volumetrically variable chambers in fluid communication with the conduits 64 and 66 aforementioned in connection with FIG. 2. Each flexible diaphragm 92 is centrally anchored by an anchoring fitting 94 to the power shaft 76. The power shaft is slidably supported by slide bearings 96 centrally mounted within the outer casing sections 86 and slide bearings 98 centrally connected to the interior casing sections 84 which close the axial ends of a motor chamber 100 formed within the housing 68. The chamber 100 is enclosed by a teflon liner 102 which is radially spaced from the thermal insulation 82 by a glass sleeve 104. Shock absorbing assemblies 106 are peripherally clamped between the casing sections 84 and the end flanges 108 of teflon liner sections 110 to absorb any thrust applied to a pair of electromagnetic coil assemblies 112 held in axially spaced relation within the housing sleeve 104 by the liner sections 102 and 110. The shock absorbing assemblies include elastically flexible disc elements 114 clamped between the liner section 110 and the casing section 84 and interleaved by disc elements 116 in wiping engagement with the reciprocating power shaft 76 axially spacing the coil assemblies from the casing section 84 as more clearly seen in FIG. 7. A plurality of elongated fastener bolt assemblies 118 extend through the insulation 82 to hold the casing sections 84 assembled with the housing 68 radially inwardly of the end flanges 88 as shown in FIGS. 4, 5 and 6.

As shown in FIG. 4, each of the coil assemblies 112 includes a non-conductive coil winding holder 120 having a central hub portion 122 through which the power shaft 76 extends. Confronting conical faces 124 of the coil holder define the axial ends of the motor chamber 100 while opposite conical faces 126 of each coil holder abut the shock absorbing assemblies 106. The central hub portion of each coil holder is provided with grooves for seating seals 128 in wiping engagement with the power shaft. Seals 130 seated in the liner sections 102 and 110 engage the radially outer peripheries of the coil holders to seal the spaces occupied by the coil conductors of the coil assemblies and to complete a pressure sealing arrangement for the motor chamber 100. The chamber 100 may therefore be effectively evacuated by connection to the vacuum pump through conduits 80 communicating with the chamber through ports 132 in the liner 102. As a result, there will be no pressure loading on the armature 134 fixed to the power shaft between the coil assemblies 112.

The armature is a permanent magnet made of a suitable body of magnetic material 136 having a protective coating 138 as shown in FIG. 8. Further, the armature is provided with opposite conical faces 140 which are substantially parallel to the confronting faces 124 of the coil assemblies and from which magnetic flux is emitted. A polarized magnetic field is axially concentrated on opposite sides of the armature and confined within chamber 100 by the cryogenic temperature conditions therein. Energization of the coil assemblies will produce synchronously reversing magnetic fields to cause reciprocation of the armature along its magnetic polar axis which coincides with the longitudinal axis of the motor chamber 100. The armature travels between limits established at the confronting faces 124 of the coil assemblies. Any axial thrust exerted as a result of armature overtravel, is absorbed by the assemblies 106 as aforementioned to preserve the pressure sealed condition of the chamber 100.

Current at cryogenically efficient levels is conducted to the coil assemblies for energization thereof by conductors enclosed in tubes 142 which extend through the fittings 78 and bores 144 formed in insulation 82 aligned with threaded fittings in the sleeve 104. Fluid communication is thereby also established between the tubes 142 and the coil conductor spaces in the coil holders which is maintained pressure sealed in the housing by the seals 130. The cryogenic cooling medium is therefore circulated by the tubes 142 through the coil winding spaces so as to maintain the coil conductors at the cryogenic temperature. Insulating conduits 146 enclose the tubes 142 externally of the housing 68.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a source of cryogenic cooling medium and a source of electrical energy, a power generating plant incorporating at least one converter means, said converter means including an insulated housing enclosing an elongated motor chamber, a pair of axially spaced electromagnetic coil assemblies mounted within the chamber and substantially extending across approximately its ends, an armature movably mounted within the housing chamber between the coil assemblies and disposed for reciprocal movement therebetween, means connected to said source of electrical energy for controlling the supply and polarity of the electrical energy conducted to the coil assemblies to effect the said movement of the armature, a power shaft connected to the said armature and disposed for sealed extension through the said coil assemblies and housing and out of the chamber, and insulated conduit means connecting with the housing for simultaneously conducting said electrical energy and the cryogenic cooling material to the coil assemblies within the motor chamber.

2. The combination of claim 1 including an outer insulated enclosure, and means for suspending the power generating plant within the outer enclosure.

3. The combination of claim 2 wherein said source of cryogenic medium includes passage means internally lining the outer enclosure within which a predetermined body of cryogenic medium is stored and circulated.

4. The invention of claim 3 and including means responsive to the operation of the motor for effecting circulation of the cooling medium through the motor to confine and concentrate the magnetic flux therein.

5. The combination of claim 4 wherein said motor includes the electromagnetic coil means to which the conduit means is connected, said cooling medium being circulated by the conduit means through the coil means for energization of the coil means under cryogenic temperature conditions.

6. The invention of claim 3 and wherein there are a pair of converter means being paralled mounted within the said insulated enclosure and cooperating to generate fluid pressure for driving use.

7. The combination of claim 6 wherein said coil assemblies have confronting conical faces defining opposite axial ends of the evacuated chamber limiting movement of the armature and pressure sealed coil enclosing spaces through which the cryogenic medium is conducted.

8. The combination of claim 7 wherein said armature is a permanent magnet having opposite flux emitting faces establishing a magnetic field polarized along said axis of the chamber.

9. The combination of claim 6 including shock absorbing means axially spacing the sealing housing from the coil assemblies within the housing.

* * * * *

UNITED STATES PATENT AND TRADEMARK OFFICE
CERTIFICATE OF CORRECTION

PATENT NO. : 4,160,924
DATED : July 10, 1979
INVENTOR(S) : Elton H. Botts

It is certified that error appears in the above-identified patent and that said Letters Patent are hereby corrected as shown below:

Claim 9, line 3, delete "sealing".

*Signed and Sealed this*

*Thirteenth* Day of *November 1979*

[SEAL]

Attest:

RUTH C. MASON
*Attesting Officer*

LUTRELLE F. PARKER
*Acting Commissioner of Patents and Trademarks*